E. M. HAWLEY.
VALVE FOR GAS RANGES.
APPLICATION FILED OCT. 1, 1917.
1,402,605. Patented Jan. 3, 1922.
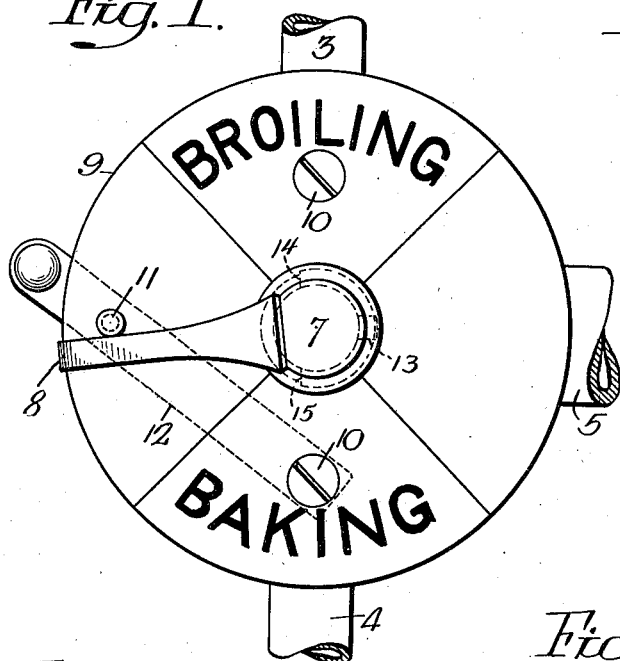
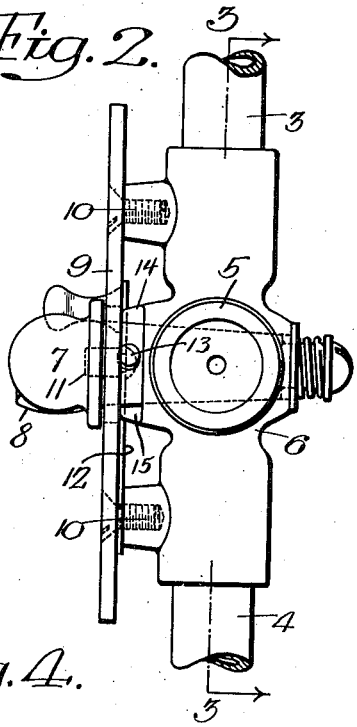
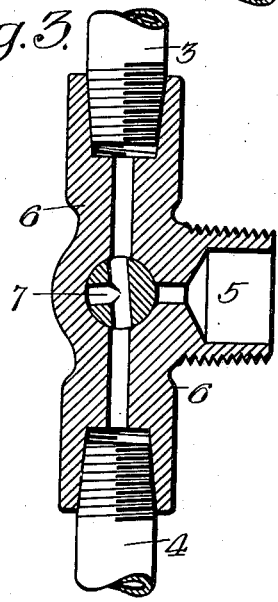
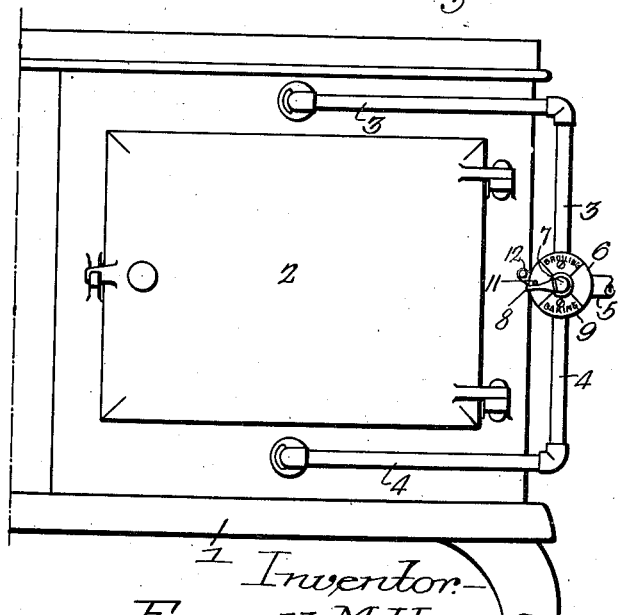
Inventor:
Everett M. Hawley.
by his Attorneys.
Howson & Howson

UNITED STATES PATENT OFFICE.

EVERETT M. HAWLEY, OF PHILADELPHIA, PENNSYLVANIA, ASSIGNOR TO ROBERTS & MANDER STOVE COMPANY, OF PHILADELPHIA, PENNSYLVANIA, A CORPORATION OF PENNSYLVANIA.

VALVE FOR GAS RANGES.

1,402,605. Specification of Letters Patent. Patented Jan. 3, 1922.

Application filed October 1, 1917. Serial No. 194,185.

*To all whom it may concern:*

Be it known that I, EVERETT M. HAWLEY, a citizen of the United States, residing in Philadelphia, Pennsylvania, have invented certain Improvements in Valves for Gas Ranges, of which the following is a specification.

My invention relates to certain improvements in gas stoves or ranges having an oven in which there are two burners or two sets of burners, one arranged to be used for broiling and the other for baking.

One object of the invention is to provide a single valve for controlling the flow of gas to the two burners, so that the supply of gas to one burner must be cut off before the gas can be supplied to the other burner.

Another object of the invention is to provide a valve so that both burners can be cut off, or either burner.

Still another object of the invention is to provide an indicator and movable stop for the valve handle when the gas is shut off.

In the accompanying drawing:—

Fig. 1, is a side view of my improved valve for regulating the flow of gas to two burners or two sets of burners;

Fig. 2, is an end view of the device illustrated in Fig. 1;

Fig. 3, is a sectional view on the line 3—3, Fig. 2; and

Fig. 4, is a view of a portion of a gas range, showing the oven and the location of the valve and the pipes leading to the burners.

1 is the body of a range. 2 is the oven. 3 is a pipe leading to the broiling burners in the upper portion of the oven. 4 is a pipe leading to the baking burners in the lower portion of the oven. 5 is a gas supply pipe and 6 is the casing of my improved valve located at the junction of the pipes 3 and 4 with the supply pipe 5. The several pipes are screwed into the valve casing 6 in the ordinary manner.

In the valve casing is a three-way valve 7 having ports so arranged that the supply of gas will be cut off from the main pipe 5 to both pipes 3 and 4. The valve can be turned so as to allow the gas supply pipe 5 to communicate with the pipe 3 leading to the broiling burners, cutting off the baking burners, or can be turned to allow communication between the supply pipe 5 and the pipe leading to the baking oven, cutting off the broiling burners. 13 is an ordinary stop pin carried by the valve 7 and arranged to come in contact with stops 14 and 15 to limit the movement of the valve. This arrangement is common in gas valves.

The valve 7 has a handle 8 and on the face of the valve is a dial 9 secured by screws 10 to the casing 6 of the valve. Projecting through the dial is a stop 11, held projected by a flat spring 12, in the present instance mounted on one of the screws 10. When the handle 8 is in the position shown in Fig. 1, then both the pipes 3 and 4 are cut off from the supply pipe 5 and the valve handle may be turned down so as to allow the gas to pass from the supply pipe 5 through the pipe 4 to the baking burners in the bottom of the oven and the pipe 3 is cut off, the pin coming in contact with the stop 14.

If it be desired to use the broiling burners, then the pin 11 is depressed so as to allow the arm 8 to pass it and to assume a vertical position, which allows the gas to flow from the pipe 5 through the pipe 3 to the broiling burner in the upper portion of the oven, while the baking burners are automatically cut off, the pin coming in contact with the stop 15.

By this construction, I simplify the gas connections of a gas range and dispense with the two valves and locking mechanism between the two valves, which is necessary to properly safeguard the user. The valve can be placed at any point on the range, according to the particular location of the several pipes.

It is the usual practice to locate two and sometimes four burners above and below the oven, but it will be understood that my invention can be used for regulating the flow of gas to a single burner at each point, or to a set of burners at said points.

I claim:—

The combination in a gas stove, or range, of an oven; two burners; independent pipes leading to the two burners; a gas supply pipe; a valve casing to which the three pipes are connected; a three-way valve mounted in the casing and having a handle; a dial mounted on the casing and having indicating marks thereon; a spring pin secured to the dial and so located as to prevent the movement of the handle from beyond the cut-off position without first depressing the pin.

In witness whereof I affix my signature.

EVERETT M. HAWLEY.